United States Patent
Foster

[15] 3,657,556
[45] Apr. 18, 1972

[54] LIQUID LEVEL SWITCH

[72] Inventor: Merrill J. Foster, Fox River Grove, Ill.
[73] Assignee: Marine Industries, Incorporated
[22] Filed: Aug. 3, 1970
[21] Appl. No.: 60,539

[52] U.S. Cl. ..................................307/118, 73/304 R
[51] Int. Cl. ..................................................H01h 45/00
[58] Field of Search..................73/304 R, 290; 340/244; 137/392; 307/118

[56] References Cited

UNITED STATES PATENTS 3,279,379  10/1966  Klyce.......................................73/304
3,368,404  2/1968   King........................................73/304

Primary Examiner—Herman J. Hohauser
Attorney—Hofgren, Wegner, Allen, Stellman & McCord

[57] ABSTRACT

A liquid level switch for maintaining the liquid level in a container between upper and lower limits. A first electrode extends into the container to the upper limit and a second electrode extends into the container to the lower limit. A single active circuit element coupled to the electrodes continually monitors the liquid level and controls a pump to maintain that level between the upper and lower limits. The electrodes are mounted within a cup-shaped housing having an open bottom for receiving the liquid upon bottom first insertion of the cup whereby an air pocket trapped within the cup prevents the liquid from rising into the upper portion of the cup to eliminate false indications caused by the liquid clinging between the electrodes.

7 Claims, 3 Drawing Figures

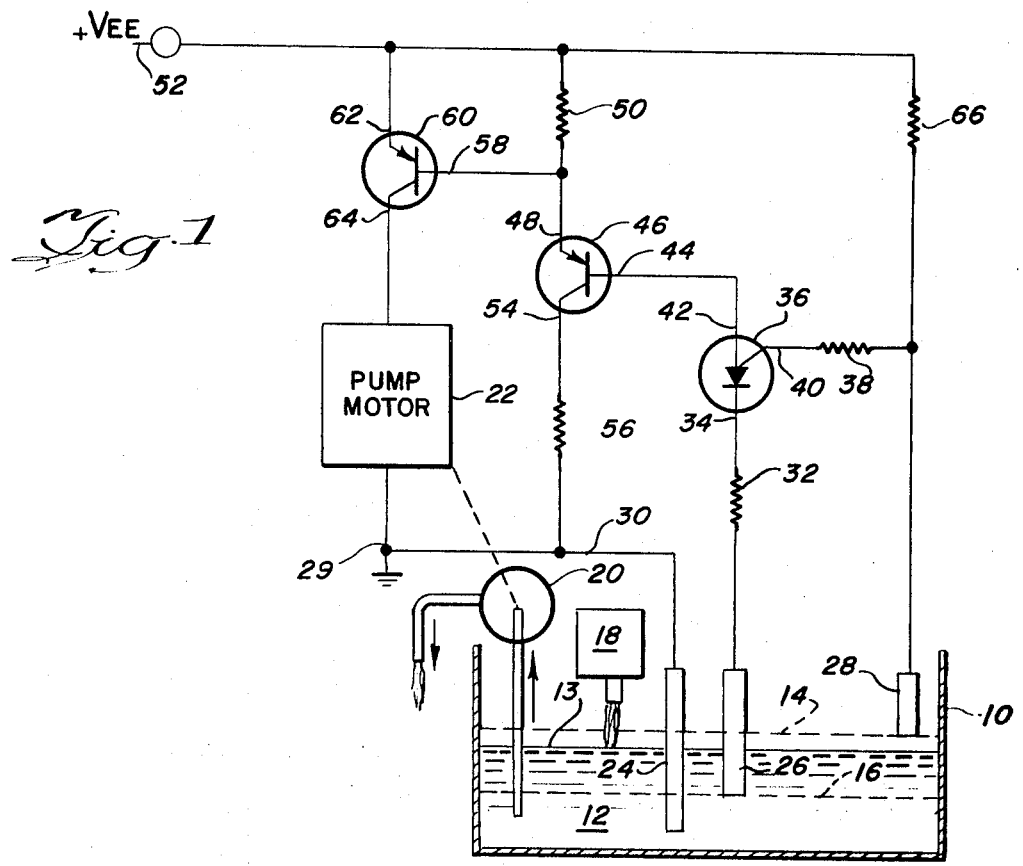
Fig. 1
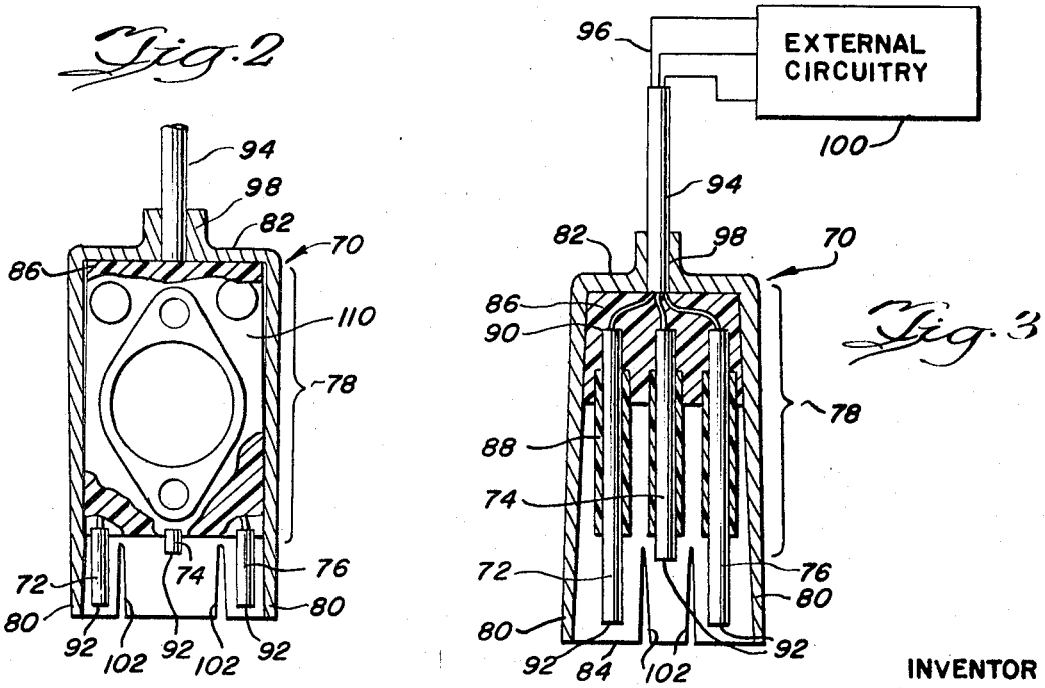
Fig. 2
Fig. 3
INVENTOR
Merrill J. Foster
BY Hofgren, Wegner, Allen, Stellman & McCord
ATTORNEYS

LIQUID LEVEL SWITCH

BACKGROUND OF THE INVENTION

This invention relates to a control system and more particularly to an improved control system for monitoring and maintaining the level of a liquid within a container between predetermined limits.

Many different methods have been employed for maintaining liquid levels between predetermined limits. One known method utilizes an electrode which, upon contact with liquid, activates a switching device to turn on a pump. A separate timing means then keeps the pump operating for the length of time required by the pump to change the level a predetermined amount. Problems are encountered using this method due to the liquid level not being continuously monitored and due to the timing means requiring adjustment or replacement each time a pump having different flow characteristics is utilized.

Another known system utilizes two electrodes, one activating a circuit to turn on the pump and another activating a second circuit to turn off the pump. The system achieves continuous monitoring, but does so at the expense of undue complexity by requiring two separate circuits.

In addition, many control circuits that utilize electrodes must provide additional circuitry to eliminate erroneous pump activation caused by liquid clinging between electrodes creating a conduction path therebetween after the liquid level has been lowered out of contact with the electrodes.

SUMMARY OF THE INVENTION

A principal object of this invention is the provision of an improved level sensing switch utilizing a single active circuit element to continually monitor the level of a liquid in a container and to control a level changing means to maintain that level between predetermined limits.

An important feature of this invention is the provision of an improved level sensing switch utilizing a thyristor having its gate input coupled to an upper limit electrode and one of its primary inputs coupled to a lower limit electrode, the thyristor assuming a low impedance state in response to the liquid contacting the upper limit electrode and assuming a high impedance state in response to the liquid falling below the lower limit electrode.

Another important feature of this invention is the provision of an improved electrode housing which eliminates the possibility of a conductive path being created between the electrodes by water clinging to the electrode mounting means between the electrodes.

BRIEF DESCRIPTION OF THE DRAWINGS

Further features and advantages of the invention will be apparent from the following description taken in connection with the accompanying drawings wherein:

FIG. 1 is a schematic circuit diagram of the liquid level switch;

FIG. 2 is a cross-sectional side view of one embodiment of the electrode assembly; and FIG. 3 is a cross-sectional side view of another embodiment of the electrode assembly.

DESCRIPTION OF THE PREFERRED EMBODIMENT

An exemplary embodiment of the liquid level switch circuit of this invention is shown in FIG. 1. A container 10 contains a liquid 12 whose level 13 is to be maintained between an upper limit 14 and a lower limit 16. A source 18 supplies liquid 12 to the container and a level changing means, such as a pump 20, mechanically coupled to pump motor 22, pumps the liquid out of the container.

Such a system as shown may be used on a boat or other water craft to control the level of the bilge water that collects in the hull. The bilge water level is maintained between upper and lower limits by operating the pump periodically.

Three electrodes extend into the container. Electrode 24 extends below lower limit 16 and couples liquid 12 to a reference ground potential 29 on lead 30. It should be noted that if container 10 were conductive, liquid 12 could be kept at the reference potential by simply coupling container 10 to that potential. Electrode 26 extends into container 10 to lower limit 16 and is coupled through resistor 32 to a primary input, cathode input 34, of a reverse-blocking triode thyristor, semiconductor controlled rectifier (SCR) 36. Electrode 28 extends into the container to upper limit 14 and is coupled through resistor 38 to the control input of SCR 36, gate input 40.

The other primary input of SCR 36, anode input 42, is coupled to base input 44 of PNP transistor 46. Emitter 48 of transistor 46 is coupled through resistor 50 to a positive DC supply voltage 52. Collector 54 of transistor 46 is coupled through resistor 56 to ground reference potential lead 30.

Emitter 48 of transistor 46 is also coupled to base input 58 of PNP transistor 60. Emitter 62 of transistor 60 is directly coupled to DC supply voltage 52. Collector 64 of transistor 60 is coupled through the coil of DC pump motor 22 to reference ground potential lead 30.

When the liquid level is below lower limit 16, SCR 36 is in a high impedance state. The gate-anode junction of SCR 36 is reversed biased by the positive voltage from DC supply voltage 52 applied through resistors 66 and 38 to gate input 40. SCR 36 is in the high impedance state also because electrode 26 is out of contact with liquid 12, and thus, no conduction path exists between cathode 34 and reference potential 29. Since SCR 36 is in the high impedance state no base drive can be supplied to transistor 46, and thus, transistor 46 is in cutoff. Since transistor 46 is in cutoff, no base drive can be supplied to transistor 60, and thus, transistor 60 is also in cutoff. Because transistor 60 is in cutoff, no current can flow through the coil of DC motor pump 22, and thus, no pumping action occurs at pump 20.

When the liquid level rises to lower limit 16, contacting electrode 26, the reference potential of the liquid is applied through electrode 26 and resistor 32 to enable SCR 36. However, SCR 36 still remains in the high impedance state since the gate-anode junction is still reversed biased, and the subsequent circuitry is maintained in the same collective state that existed prior to liquid 12 contacting electrode 26.

When the liquid rises to upper limit 14, the reference potential of the liquid, applied through electrode 28 to the junction between resistors 38 and 66, forward biases the gate-anode junction of SCR 36. When this junction becomes forward biased a sufficient amount of gate current flows to decrease the breakover voltage below the cathode-anode forward bias voltage and SCR 36 assumes a low impedance state. The anode current is limited primarily by resistor 32 and exceeds the latching current, the minimal amount of anode current required to sustain conduction with the gate signal removed immediately after SCR 36 is switched from the high impedance state to the low impedance state.

The anode current of SCR 36 drives the base of transistor 46 which turns on in response thereto. The voltage at base 58 of transistor 60 and collector 48 of transistor 46 drops to approximately half of the potential difference between positive DC supply voltage 52 and reference potential 29. Thus, transistor 60 is driven into saturation and completes a circuit from positive DC supply 52 at emitter 62 to ground reference potential 29 through the coil of pump motor 22, actuating pump 20 to lower the liquid level below upper limit 14.

The liquid level 13 subsequently drops below upper limit 14, breaking contact with electrode 28, and removing the gate current supply to SCR 36. However, SCR 36 remains in the low impedance state since, as previously mentioned, the latching current had been reached, and pump motor 22 remains on.

After SCR has been switched to the low impedance state and the latching current is reached, a certain minimum value of anode current, referred to as the holding-current, is required to maintain the SCR in this low impedance state. If the anode current is reduced below this critical holding-current value, it cannot maintain regeneration and reverts to the high impedance state. Thus, when pump 20 lowers the liquid level below lower limit 16, breaking the conduction path between cathode 29 and reference potential 29, the anode current drops below the holding-current, and SCR 36 switches to the high impedance state. This removes base drive from transistor 46 which turns off in response thereto. When transistor 46 turns off, base drive is removed from transistor 60 which turns off in response thereto, thereby deactuating pump motor 22. The cycle continues and pump motor 22 will not be actuated again until liquid level 13 again reaches upper limit 14.

As previously mentioned, many liquid level control systems utilizing electrodes must provide additional circuitry to eliminate actuation of the liquid level changing means caused by liquid clinging to the electrodes. For example, in the liquid level switch of this invention shown in FIG. 1, liquid clinging to electrodes 24 and 26 and mounting means therebetween would keep SCR in its low impedance state after the liquid level had dropped below lower limit 16. This problem can be eliminated by utilizing the unique electrode housing of this invention, embodiments of which are shown in FIGS. 2 and 3.

In FIG. 2 of the drawings, a cross sectional view of one embodiment of the unique electrode housing of this invention is shown having a cup-shaped member, generally designated 70, with elongated electrodes 72, 74 and 76 extending therein. Cup-shaped member 70 has an air impervious upper portion, generally designated 78, formed by side walls 80 and top 82, and an open bottom 84 for receiving the liquid upon bottom first insertion of the cup-shaped member 70.

Means within upper portion 78, such as an encapsulating material 86, support the electrodes within cup-shaped member 70 away from each other and side walls 80. Upper ends 90 of the electrodes are encapsulated within encapsulating material 86 and supported therein. An insulating, moisture impervious, outer protective covering 88, such as a vinyl tubing, surrounds each of the electrodes to prevent corrosion and shorting. Protective covering 88 extends from a point within encapsulating material 88 to a point above the bottom end 92 of each of the electrodes, such that only the bottom ends of the electrodes can come into active contact with the liquid.

Cable 94, containing a plurality of leads 96, extends from a point external of cup-shaped member 70 into upper portion 78 through cable passageway 98 to connect the electrodes to external circuitry 100. Each one of the plurality of leads 96 is coupled to the upper end of a different electrode. Cable 94 tightly fits within cable passageway 96 to maintain upper portion 78 air impervious.

Air passageways in the form of slots 102 extend through side walls 80. Slots 102 extend from bottom 84 to a point above the bottom end of the least downwardly extending electrode, electrode 74, to insure that the liquid can rise at least to that level.

The aforementioned problems caused by clinging liquid are eliminated by the inverted cup-shaped member. When liquid rises around the cup-shaped member, an air pocket is trapped in upper portion 78 between encapsulating material 86 and the upper ends of air passage slots 102. This air pocket prevents the liquid from rising into the upper portion up to encapsulating material 86 or any other supporting means therein. Since the liquid does not contact all of the surfaces adjoining two electrodes, or an electrode and cup-shaped member 70, a conductive surface path between two electrodes is not formed.

In FIG. 3 another embodiment of the electrode housing is shown having similar elements identically labeled as those in FIG. 2. In this embodiment a printed circuit card 110 is mounted within cup-shaped member 70 and supported therein by encapsulating material 86. The level switching circuitry and the electrodes are directly mounted to printed circuit card 110, thereby eliminating the necessity of extending long leads from the electrodes to the level switching circuitry.

While I have shown and described certain embodiments of my invention, it is to be understood that it is capable of many modifications. Changes, therefore, in the arrangement and construction may be made without departing from the spirit and scope of the invention as disclosed in the appended claims.

I claim:

1. A liquid level switch for controlling a level changing means to maintain the level of a liquid in a container between upper and lower limits, comprising:
   a first electrode extending into said container to said upper limit;
   a second electrode extending into said container to said lower limit;
   an active circuit element having first and second primary inputs and a control input, said element assuming a first impedance state in response to a conduction path from said control input through said first electrode to said liquid being completed by said liquid rising to said upper limit and assuming a second impedance state in response to another conduction path from said second primary input through said second electrode to said liquid being broken by said liquid falling below said lower limit; and
   means coupling said circuit element to said level changing means, said level changing means being controlled in response to said active circuit element changing states.

2. The liquid level switch of claim 1 including means to maintain said liquid at a reference potential,
   said circuit element being enabled by said reference potential being applied to said primary input through said second electrode and subsequently assuming said first impedance state in response to said reference potential being applied to said control input through said first electrode.

3. The liquid level switch of claim 2 wherein said circuit element in said first impedance state conducts a sufficient current to maintain said first impedance state after removal of said reference potential from said control input by said liquid level dropping below said first electrode.

4. The liquid level switch of claim 2 wherein said circuit element assumes said second impedance state in response to said current decreasing below a holding current value, said current decreasing below said value in response to said level falling below said second electrode.

5. The liquid level switch of claim 1 wherein said means coupling said level changing means to said circuit element includes a switching element switching on and off in response to said circuit element assuming said first and second impedance states, said level changing means being actuated and deactuated in response to said switching element switching on and off.

6. The liquid level switch of claim 5 wherein said switching element comprises a transistor having a base coupled to said first primary input, an emitter coupled to a DC supply voltage and a collector coupled to said reference potential, said transistor being turned on in response to said circuit element conducting current between said base and said second electrode.

7. The liquid level switch of claim 1 wherein said circuit element comprises a semiconductor controlled rectifier having a gate, cathode and anode; said gate, cathode and anode, respectively, comprising said control input, second primary input and first primary input; and said reference potential comprises a ground potential.

* * * * *